(12) United States Patent
Chung et al.

(10) Patent No.: US 11,489,326 B1
(45) Date of Patent: Nov. 1, 2022

(54) CABLE GUIDES

(71) Applicant: Hewlett-Packard Development Company, L.P., Spring, TX (US)

(72) Inventors: Tien Liang Chung, Taipei (TW); Ching Ho Wang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/337,813

(22) Filed: Jun. 3, 2021

(51) Int. Cl.
*H02G 3/00* (2006.01)
*H02G 11/00* (2006.01)
*H01R 13/62* (2006.01)
*H01R 13/00* (2006.01)
*H02G 3/32* (2006.01)
*H01R 13/627* (2006.01)
*H02G 3/06* (2006.01)

(52) U.S. Cl.
CPC ............. *H02G 11/00* (2013.01); *H02G 3/32* (2013.01); *H01R 13/6273* (2013.01); *H01R 13/6275* (2013.01); *H01R 13/6277* (2013.01); *H02G 3/065* (2013.01)

(58) Field of Classification Search
CPC .......... H02G 11/00; H02G 3/32; H02G 3/065; H02G 7/00; H01R 13/065; H01R 13/65; H01R 13/6275; H01R 13/6277; H01R 13/6273
See application file for complete search history.

(56) References Cited

U.S. PATENT DOCUMENTS

| | | | | |
|---|---|---|---|---|
| 1,432,882 A * | 10/1922 | Lobl | ...................... | F16K 7/063 222/207 |
| 4,288,655 A * | 9/1981 | Lass | ...................... | H02G 3/065 439/457 |
| 5,241,136 A * | 8/1993 | Michaelis | ............ | H02G 3/0658 174/653 |
| 6,565,383 B1 * | 5/2003 | Wu | ..................... | H01R 12/7023 439/567 |
| 6,890,189 B1 * | 5/2005 | Wu | ..................... | H01R 13/6581 439/906 |
| 6,951,474 B1 * | 10/2005 | Wu | ..................... | H01R 13/6275 439/358 |
| 7,329,158 B1 * | 2/2008 | Roberts | ................ | H01R 13/115 439/825 |
| 2014/0322933 A1 * | 10/2014 | Li | ...................... | H01R 13/5845 439/76.1 |

* cited by examiner

*Primary Examiner* — Tan Le
(74) *Attorney, Agent, or Firm* — Brooks Cameron & Huebsch PLLC

(57) ABSTRACT

In some examples, a cable guide can include a cable flange including a body, an arm extending a distance away from the body, a retention mechanism to retain the cable flange in a housing, and a first attachment mechanism. The cable guide can include a pull tab including a second attachment mechanism coupled to the first attachment mechanism, where the arm is disengaged from the housing when the cable guide is in a disengaged position, and the arm is engaged with the housing and the cable flange and the housing are to form a pathway when the cable guide is in an engaged position.

19 Claims, 8 Drawing Sheets

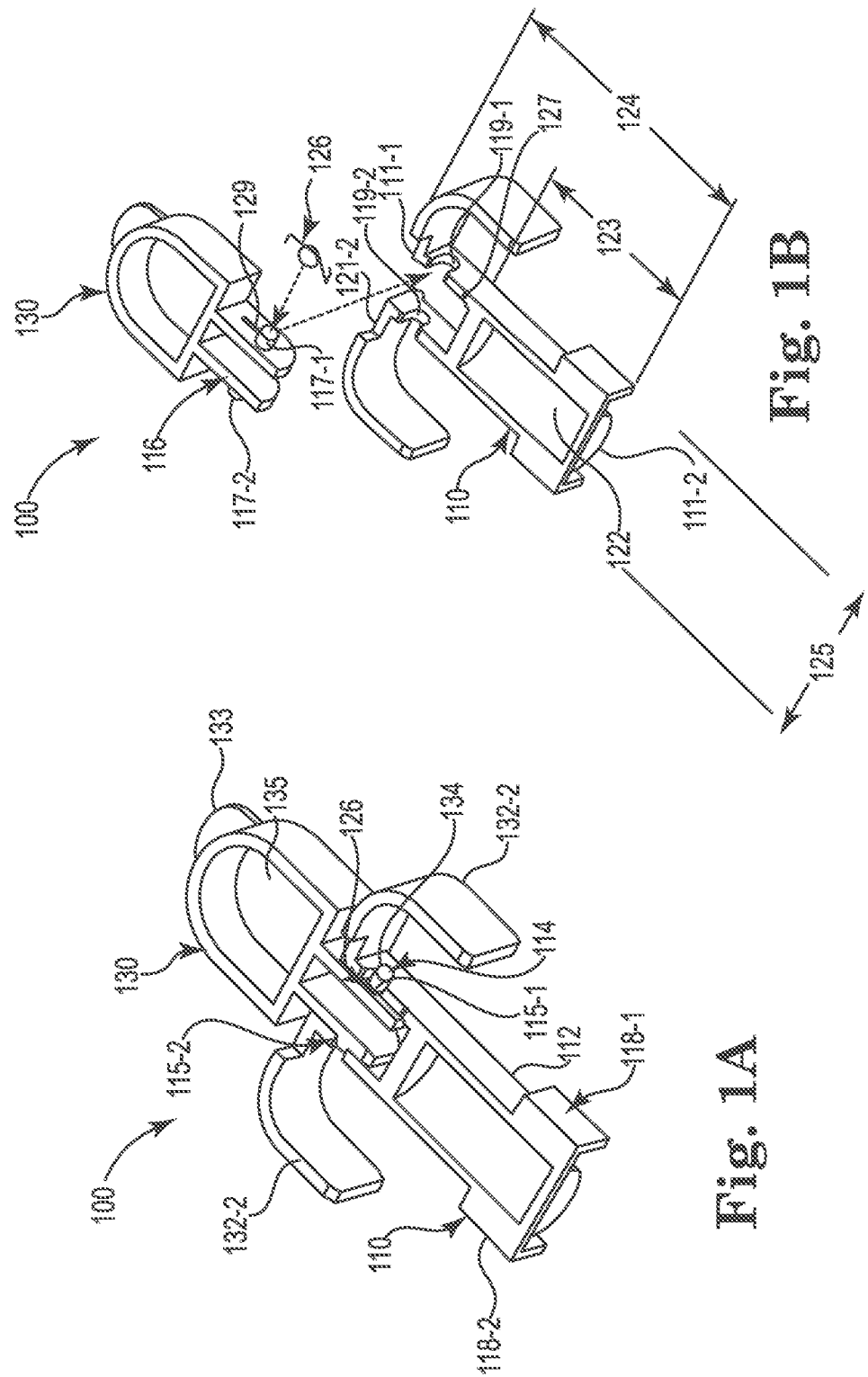

CABLE GUIDES

BACKGROUND

Computing devices can transmit information to and/or from other devices. Such devices may be, for instance, be peripheral devices. For example, a computing device may connect to a peripheral device via a wired connection. Such a wired connection may connect the peripheral device to a port on the computing device and/or an associated peripheral device.

Such ports may include input/output (I/O) ports. Examples of I/O ports can include universal serial bus (USB) ports, audio jacks, card readers, power jacks, High-Definition Multimedia Interface (HDMI) ports, register jack (RJ)s, among others. As described above, I/O ports can be used to support various peripheral devices that may be used in conjunction with the computing device, such as data drives, keyboards, mice, displays, and the like.

BRIEF DESCRIPTION OF THE DRAWINGS

FIG. 1A is a perspective view of an example of a cable guide consistent with the disclosure.

FIG. 1B is an exploded view of an example of a cable guide consistent with the disclosure.

DETAILED DESCRIPTION

As mentioned, input/output (I/O) ports such as universal serial bus (USB) ports can be used to support various peripheral devices. Examples of peripheral devices include data drives, keyboards, mice, displays, and the like. A peripheral device may include a wired connection to connect to an I/O port.

A computing device may utilize multiple I/O ports. Utilization of multiple I/O ports can result in multiple wired connections, each with associated cables. As used herein, the term "cable" refers to an insulated electrical conductor. Cables can, for instance, allow a peripheral device to connect to an I/O port of a computing device and allow the transfer of information (e.g., data) and/or power therebetween.

Multiple wired connections can result in the presence of multiple cables. The presence of multiple cables can result in an unsightly space in and/or area around a computing device. Further, the presence of multiple wired connections can result in tangled and/or disheveled cables, which can result in a poor user experience.

Moreover, without a secure routing of such a cable connected to an I/O port, chances for theft can be increased relative to using secure cable routing. For example, an unauthorized and/or nefarious individual may readily disconnect a peripheral device from an I/O port of a computing device to steal the peripheral device as compared with approaches utilizing secure cable routing.

Further, some approaches may route and/or secure cables utilizing a cable tie. However, utilizing cable ties can be difficult and/or time-consuming. For instance, cable ties can be difficult to release such as when a user wants to move/disconnect a cable and/or altogether remove a peripheral device connected via a cable to an I/O port of a computing device. For example, a cable tie may have to be physically cut off to release the cable tie. As a result, cable ties may not be reusable and/or may utilize a separate/dedicated tool to release the cable tie.

Cable guides according to the disclosure can provide a secure cable routing mechanism. A portion of a cable guide can be secured in a housing of a computing device and/or display to provide a pleasing aesthetic. Additionally, the cable guide can form a pathway with the housing when the cable guide is to be used to route a cable. Further, a cable guide can be employed in conjunction with a lock slot to allow for use of a locking mechanism to prevent theft of a peripheral device and/or the cable guide itself. Accordingly, cable guides can provide for a reusable, effective, secure, and easy to use cable routing apparatus as compared with other approaches.

Figure 1C:
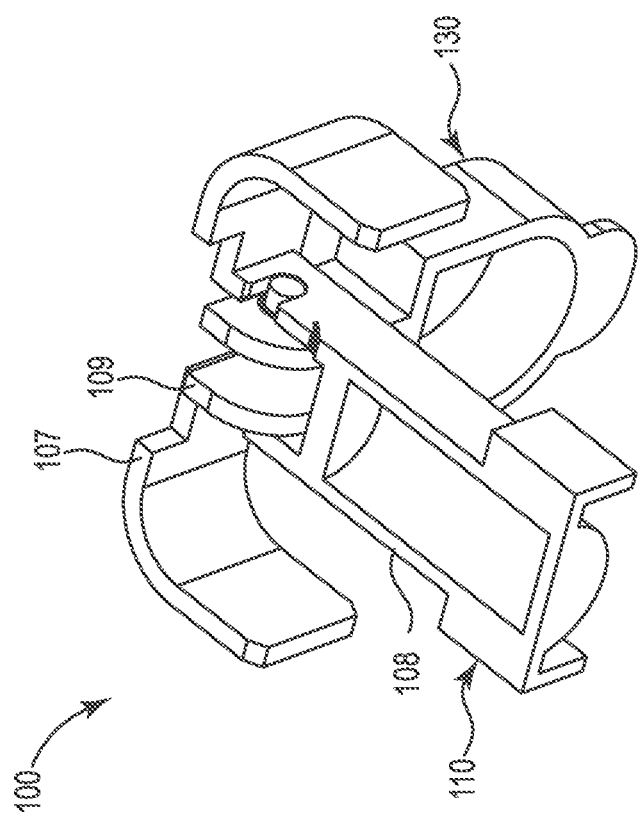
FIG. 1C is another perspective view of an example of a cable guide consistent with the disclosure.

FIG. 1A is a perspective view of an example of a cable guide 100 consistent with the disclosure. FIG. 1B is an exploded view of an example of a cable guide 100 consistent with the disclosure. FIG. 1C is another perspective view of an example of a cable guide 100 consistent with the disclosure. As used herein, the term "cable guide" refers to a device shaped to route a cable. For example, the cable guide 100 can be shaped in a manner to support and/or direct a cable, where the cable guide 100 in combination with a housing can provide a pathway for a cable, as is described herein.

As illustrated in FIG. 1A, the cable guide 100 can include a cable flange 110 and a pull tab 130. As used herein, the term "cable flange" refers to an projection of material of a cable guide having an arm and an attachment mechanism for attachment to another object such as a pull tab. The cable flange 110 can be located, at least partially, external to the housing to define a pathway, as detailed herein. For instance, a portion of the cable flange 110 may remain disposed in the housing while another portion of the cable flange 110 is external to the housing and forms a pathway, as detailed herein.

As used herein, the term "pull tab" refers to a external projection of material of a cable guide that provides a place for attachment to another object such as a cable flange. The pull tab 130 can be located external to a housing, as detailed herein. The pull tab 130 can be coupled to the cable flange 110 to transfer a force imparted on the pull tab 130 to the cable flange 110 and thereby promote movement of the cable guide 100 between an engaged position and a disengaged position, as detailed herein.

The cable flange 110 can include a body 112. As illustrated in FIG. 1A, FIG. 1B, and FIG. 10, the body 112 can be an elongated body having a length 124 that it greater than a width 125 of the body 112.

The cable flange 110 can include an arm (e.g., a first arm 132-1 and/or a second arm 132-2) that extends from the body 112. That is, the arm can be included in a plurality of arms. However, while illustrated as two distinct arms, a quantity, shape, and/or a location of a protrusion can be varied. For instance, an individual arm can be employed in some examples. As illustrated in FIG. 1A, FIG. 1B, and FIG. 10, the arm can be formed of an open curve. For instance, the arm can curve from a location at which the arm is in contact with the body 112 toward a retention mechanism and/or toward a housing, as detailed herein. That is, the arm (e.g., the first arm 132-1 and/or the second arm 132-2) can be located at the first distal end 111-1 and the retention mechanism can be located at the second distal end 111-2. Stated differently, the arm can curve away from the first distal end 111-1 of the body 112 toward the second distal end 111-2 of the body 112 that is on the opposite side of the body 112 from the first distal end 111-1.

Figure 2B:
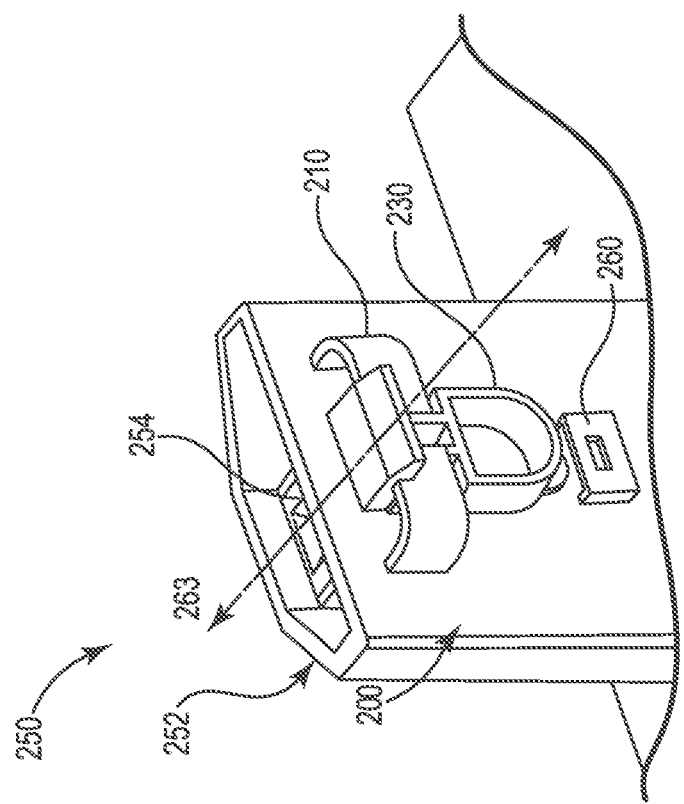
FIG. 2B is another view of an example of a system including a cable guide having a cable flange in an engaged position and a pull tab in a secure position consistent with the disclosure.
Figure 2A:
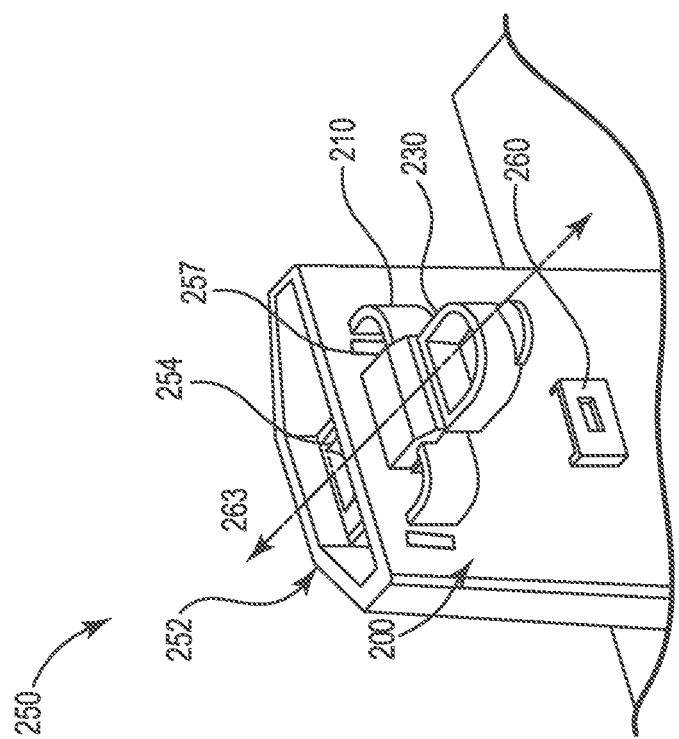
FIG. 2A is a view of an example of a system including a cable guide having a cable flange in a disengaged position and a pull tab in a release position consistent with the disclosure.

The cable flange 110 can have a retention mechanism such a first retention mechanism 118-1 and/or a second retention mechanism 118-2 that is to retain the cable flange 110 in a housing (e.g., housing 252 as illustrated in FIG. 2A). For instance, the retention mechanism can be formed on the body 112 of the cable flange 110, as illustrated in FIG. 1A. While illustrated as two retention mechanisms, the quantity, shape, and/or location of a retention mechanism can be varied. For instance, an individual retention mechanism can be employed in some examples.

As illustrated in FIG. 1A, a retention mechanism can be a rib or other type of projection extending a distance away from the body 112. However, in some examples, the retention mechanism can be a channel or other type of depression formed in the body 112. For instance, the retention mechanism can be a rib or a channel and the housing can include the other of the rib or the channel. In this way, the rib and the corresponding channel can movably couple the cable flange 110 to the housing.

The body 112 can define a cavity 122 to receive a dispositioning mechanism such as a spring, as detailed herein. The cavity 122 can extend through a portion 123 of a total length 124 of the body 112. The cavity 122 can be shaped/sized to receive the dispositioning mechanism, as detailed herein. For instance, as illustrated in FIG. 1A, 1B, and FIG. 10, the cavity 122 can be cylindrical and can receive a cylindrical dispositioning mechanism (e.g., a spring). However, other shapes and/or configurations of the cavity 122 and/or the dispositioning mechanism are possible. As illustrated in FIG. 1A, FIG. 1B, and FIG. 10, the cavity 122 can be a U-shaped depression formed in the body 112. As detailed herein, the dispositioning mechanism, when present, can disposition the cable guide 100 to the engaged position.

The first arm 132-1 and the second arm 132-2 can be co-located on the same side of the cable flange 110. For instance, as illustrated in FIG. 1A, FIG. 1B, and FIG. 10, the first arm 132-1 and the second arm 132-2 can be co-located on the same side of the cable flange 110 that is on an opposite side of the body 112 from a retention mechanism (e.g., the first retention mechanism 118-1 and/or the second retention mechanism 118-2). The first arm 132-1 and the second arm 132-2 can be the same shape and size, as illustrated in FIG. 1A, FIG. 1B, and FIG. 10. The first arm 132-1 and the second arm 132-2 can extend the same distance from the body 112, as illustrated in FIG. 1A, FIG. 1B, and FIG. 10. Having the first arm 132-1 and the second arm 132-2 be the same shape, same size, and/or extend the same distance from the body 112 can promote aspects herein such as coupling the cable flange 110 to the pull tab 130. For instance, the first arm 132-1 and the second arm 132-2 can together form an area therebetween that is to receive a portion of the pull tab 130 such as a second attachment mechanism 116, as described herein, of the pull tab 130.

For instance, the cable flange 110 can include a first attachment mechanism 114 and the pull tab can include the second attachment mechanism 116. The first attachment mechanism 114 and the second attachment mechanism 116 can couple the pull tab 130 to the cable flange 110 and thereby permit the cable guide 100 to move between an engaged position and a disengaged position, as detailed herein. Stated differently, the first attachment mechanism 114 and the second attachment mechanism 116 can together movably couple the pull tab 130 to the cable flange 110.

In some examples, the first attachment mechanism 114 can include a notch or a corresponding protrusion that is shaped and sized to be disposed in the notch. The second attachment mechanism 116 can include the other of the notch or the corresponding protrusion. For instance, the first attachment mechanism 114 can include or be formed of a notch such as a first notch 119-1 and/or a second notch 119-2 in the body 112 of the cable flange 110. In such instances, the second attachment mechanism 116 can include or be formed of a corresponding protrusion such as a first protrusion 117-1 and/or a second protrusion 117-2. As mentioned, the corresponding protrusion can be shaped and sized to be disposed in the notch. Thus, the first attachment mechanism 114 and the second attachment mechanism 116 can together movably couple (e.g., rotatably couple) the pull tab 130 to the cable flange 110, for instance, by permitting rotation about the corresponding protrusion disposed in the notch.

The cable guide 100 can include a torsion mechanism 126. As illustrated in FIG. 1A, FIG. 1B, and FIG. 10, the torsion mechanism 126 can be a torsion spring. However, other types of torsion mechanisms may be employed in the alternative to or in addition to a torsion spring. The torsion mechanism 126 can be disposed at an interface (e.g., a first interface 115-1 and/or a second interface 115-2, as detailed herein) between the cable flange 110 and the pull tab 130. As such, the torsion mechanism 126 can contact and impart a force on the cable flange 110 and the pull tab 130 to disposition the pull tab 130 to a given position (e.g., a release position) relative to the cable flange 110. For instance, the torsion mechanism 126 can be disposed at the first interface 115-1, while the respective ends of the torsion mechanism 126 contact and impart forces on respective surfaces of the cable flange 110 and the pull tab 130 to disposition the pull tab 130 to a release position. As such, an end of the torsion mechanism 126 can contact a surface (e.g., slot 127) in the body 112 of the cable flange 110 and another end of the torsion mechanism 126 can contact a surface (e.g., extension 129 extending from the first protrusion 117-1) of the pull tab 130.

The cable flange 110 can be a continuous extension of material. In other words, the retention mechanism (e.g., the first retention mechanism 118-1 and the second retention mechanism 118-2), the body 112, and the arm (e.g., the first arm 132-1 and the second arm 132-2) can be a unitary body, as illustrated in FIG. 1A, FIG. 1B, and FIG. 10. Being a unitary body promote aspects of cable guides herein such as providing structural integrity to cable flange 110. However, in some examples, the retention mechanism, the body, and/or the arm can be separate and distinct components which are coupled (e.g., mechanically coupled via a fastening mechanisms such as screw) together. Having the retention mechanism, the body, and/or the arm can be separate and distinct components which are coupled together can permit customization of the cable flange 110 and/or permit replacement of the component over an operational lifetime of the cable flange 110.

As mentioned, the cable guide 110 can include the pull tab 130. In some examples, the pull tab 130 can be a pull ring having an opening 135, as illustrated in FIG. 1A, FIG. 1B, and FIG. 10. The cable guide 1100 and the pull tab 130, can form an apparatus, as detailed herein. For instance, the pull tab 130 can include an annulus 134 (defining the opening 135) and a second attachment mechanism 116 extending from the annulus 134. As used herein, the term "annulus" refers to a part having an opening to permit the annulus to be coupled, via a coupling mechanism, to another object. For example, the annulus 134 can be utilized to couple the pull tab 130 to a cable flange 110. The annulus 134 can be ring-shaped or circular. However, in some examples, the attachment annulus may have a different shape other than ring-shaped (e.g., rectangular, hexagonal, etc.). For instance, in some examples, the annulus 134 can be a U-shaped opening. Having the annulus be U-shaped can promote application of a force to an annulus (e.g., a pull force to move the cable guide 100 to a disengaged position) and yet provide a thin profile as compared to other shapes.

The pull tab 130 can include an security tab 133. As used herein, an operation tab refers to a projection or material component that extends from the pull tab 130 and is to interface with a locking mechanism, as detailed herein. The security tab 133 can be in contact with the locking mechanism, when the locking mechanism is disposed in a lock slot, as detailed herein. The security tab 133 can be located on an opposite side of the pull tab 130 from the second attachment mechanism 116, as illustrated in FIG. 1A, FIG. 1B, and FIG. 10.

In some examples, the pull tab 130 can be a continuous extension of material. In other words, the pull tab 130, the second attachment mechanism 116, the security tab 133, and the annulus 134 can be a unitary body, as illustrated in FIG. 1A, FIG. 1B, and FIG. 10. Having the pull tab 130, the second attachment mechanism 116, the security tab 133, and the annulus 134 be a unitary body promote aspects of cable guides herein such as providing structural integrity to permit the pull tab to receive a force which is move the cable guide 100 between an engaged position and a disengaged position. However, the second attachment mechanism 116, the security tab 133, and the annulus 134 can be separate and distinct components which are coupled (e.g., mechanically coupled via a fastening mechanisms such as screw) to the pull tab 130. Having the second attachment mechanism 116, the security tab 133, and the annulus 134 can be separate and distinct components which are coupled to the pull tab 130 can permit customization of the pull tab 130 and/or permit replacement of the component over an operational lifetime of the cable guide 100.

When the cable guide 100 is in the engaged position and the pull ring is in the secure position, as illustrated in FIG. 10, a surface (e.g., a top surface 107) of the cable flange 110 can be co-planar with a surface (e.g., a top surface 109) of the pull tab 130. For instance, the top surface 107 of the cable flange 110 and the tope surface 109 of the pull tab 130 can extend the same distance above a surface 108 of the body 112 of the cable flange 110. However, when in the when the cable guide 300 is in the disengaged position and the pull ring is in a release position, as illustrated in FIG. 1A, the surface (e.g., the top surface 109 as illustrated in FIG. 10) of the pull tab 130 is not co-planar with the surface of the cable flange 110.

Figure 2D:
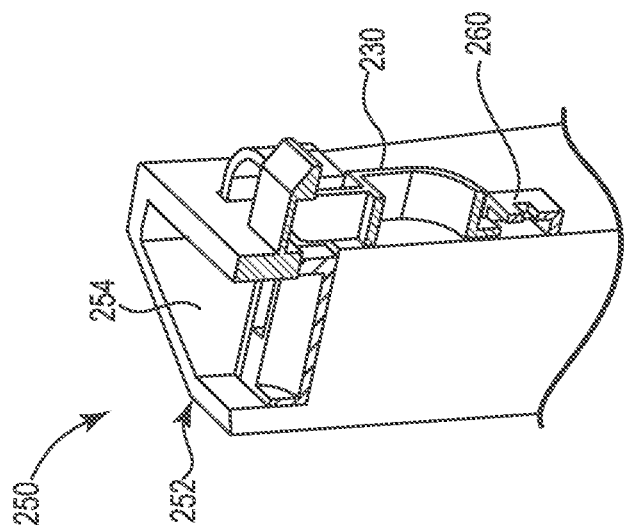
FIG. 2D is a section view of the example of the system of FIG. 2B.
Figure 2C:
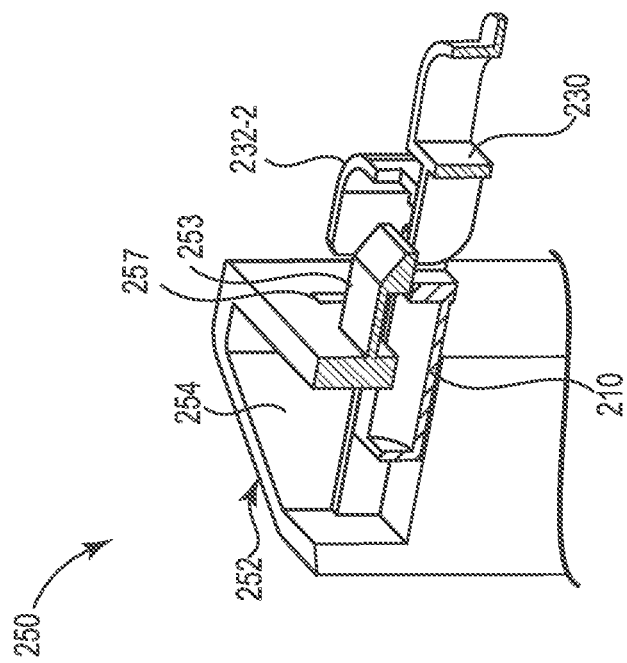
FIG. 2C is a section view of the example of the system of FIG. 2A.

FIG. 2A is a view of an example of a system 250 including a cable guide 200 having a cable flange 210 in a disengaged position and a pull tab 230 in a release position consistent with the disclosure. FIG. 2B is another view of an example of the system 250 including the cable guide 200 having the cable flange 210 in an engaged position and the pull tab 230 in a secure position consistent with the disclosure. FIG. 2C is section view taken along section line 263 of FIG. 2A. FIG. 2D is a section view taken along section line 263 of FIG. 2B.

The cable guide 200 can mechanically attach to a housing 252, as described herein. As used herein, the term "housing" refers to an enclosure or other support structure of a device. For example, the housing 252 can be an outer shell making up a portion of a computing device, a display device, and/or an all-in-one (AIO) computing device, etc. As used herein, an AIO computing device refers to a computer which integrates the internal components into the same housing as the display and can offer a touch input functionality of a tablet device while also providing a processing power and a viewing area of desktop computing systems.

The housing 252 can include a recessed surface 254. The recessed surface 254 can be a portion of a structure defining an opening and/or cavity in the housing 252. As used herein, the term "recessed surface" refers to a portion of a structure that is located away from an outer surface of the structure. The recessed surface can be located on an interior portion of the housing 252. The opening formed by the recessed surface 254 in the housing 252 can receive a portion of the routing mechanism and its constituent components (a portion of the cable guide 200), as is further described herein.

The cable guide 200 can be movable between the disengaged position and an engaged position via rotation of the pull tab 230 relative to the cable flange 210, via translation of the cable flange 210 relative to the housing 252, or both. For instance, the cable guide 200 can be dispositioned toward an engaged position collectively by a first (translational) force imparted by the dispositioning mechanism (e.g., dispositioning mechanism 358 as detailed herein) and by a second (rotational) force imparted by a torsion mechanism (e.g., torsion mechanism 126 as detailed herein).

As illustrated in FIGS. 2A and 2C, the cable guide 200 can translate away from the housing to a disengaged position such that the cable flange 210 is to contact a lip 253 extending from the housing 252 and the arm (e.g., the second arm 232-2) of the cable flange pull tab is moved away from and not in contact with the housing 252. That is, in the disengaged position the arm of the cable flange 210 is not in contact with the housing 252.

However, as illustrated in FIG. 2B and FIG. 2D, the cable guide 200 can translate toward the housing 252 to an engaged position such that the cable flange 210 not in contact with lip 253 and instead the arm is in contact with the housing 252 such as a slot 257 in the housing 252. The slot 257 can be sized and shaped to receive a portion of an arm. That is, in the engaged position the arm of the cable flange 210 can be in contact with a slot (e.g., the slot 257) in the housing 252. Having a portion (e.g., a distal end) of the arm of the cable flange 210 be disposed in the slot (e.g., slot 257) can enhance the security of the cable pathway for instance by providing a bounded area in which cable can be routed and also ensure that the cable guide remains in the engaged position. In addition, when in the engaged position, the pull tab 230 can be proximate to a lock slot 260 which can permit a locking mechanism, when present, to promote retention of the pull tab 230 in the secure position, as detailed herein.

Figure 3B:
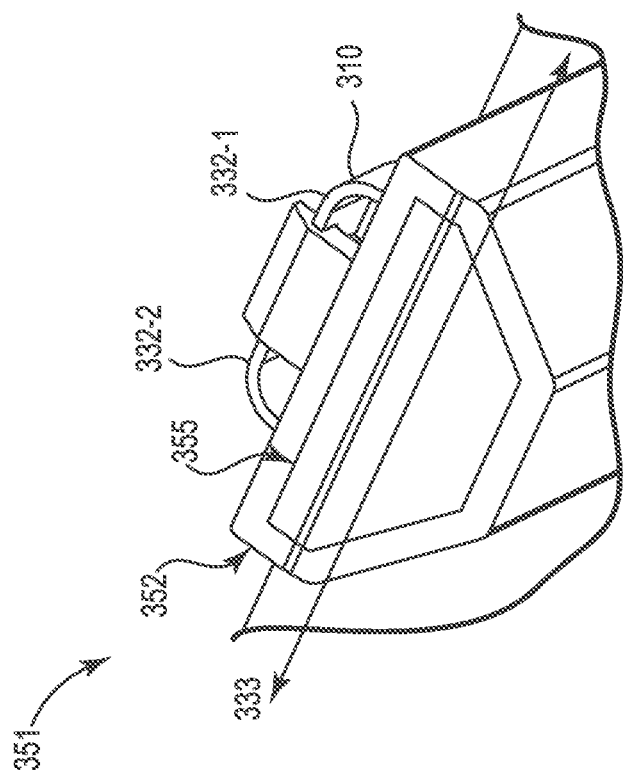
FIG. 3B is a view of an example of the system including the cable guide and the cover consistent with the disclosure.
Figure 3A:
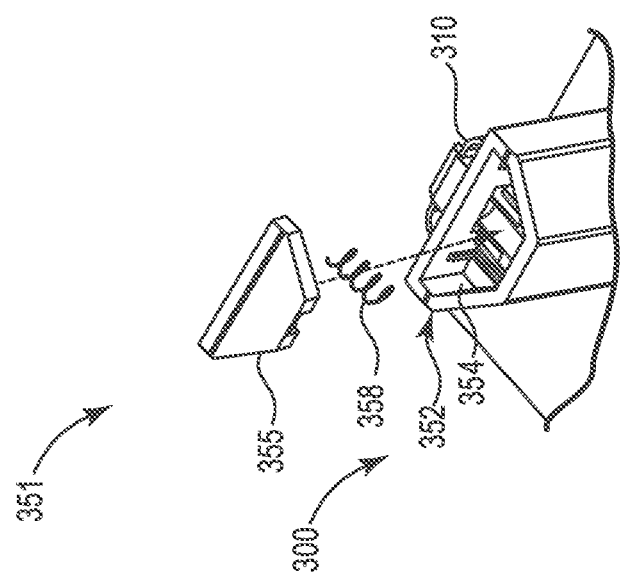
FIG. 3A is an exploded view of an example of a system including a cable guide and a cover consistent with the disclosure.
Figure 3C:
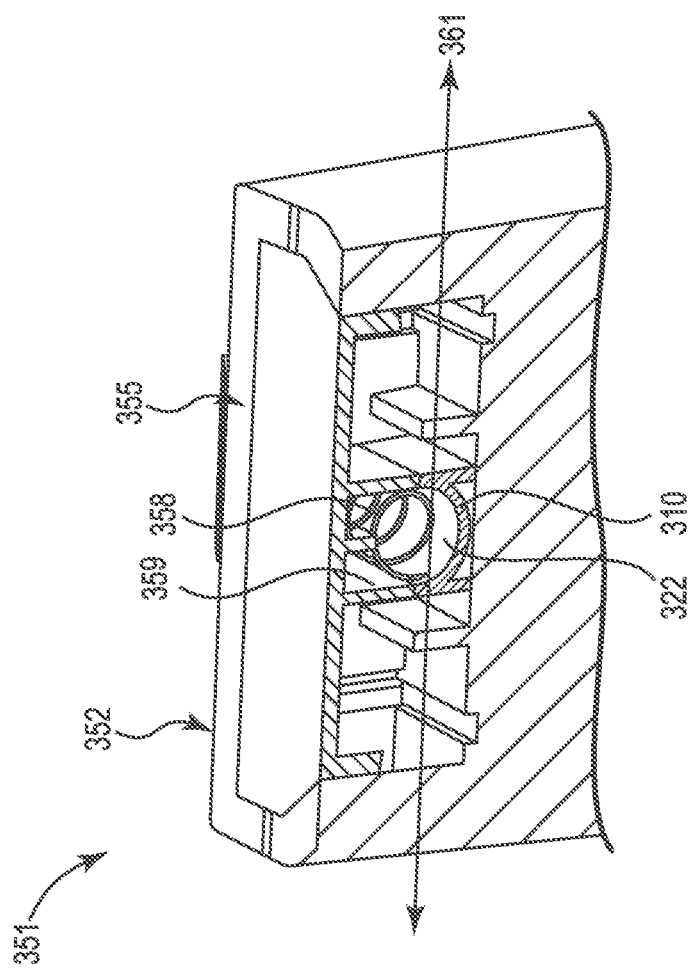
FIG. 3C is a section view of an example of the system of FIG. 3B.
Figure 3E:
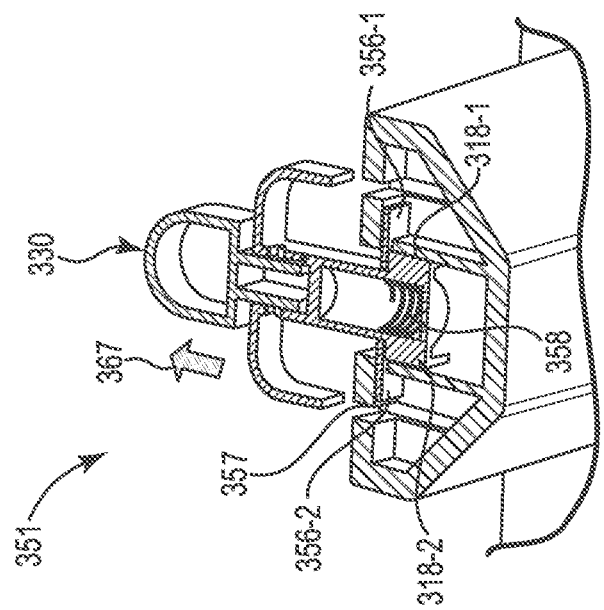
FIG. 3E is a section view of an example of the system including the cable guide when in a disengaged position and the cover consistent with the disclosure.
Figure 3D:
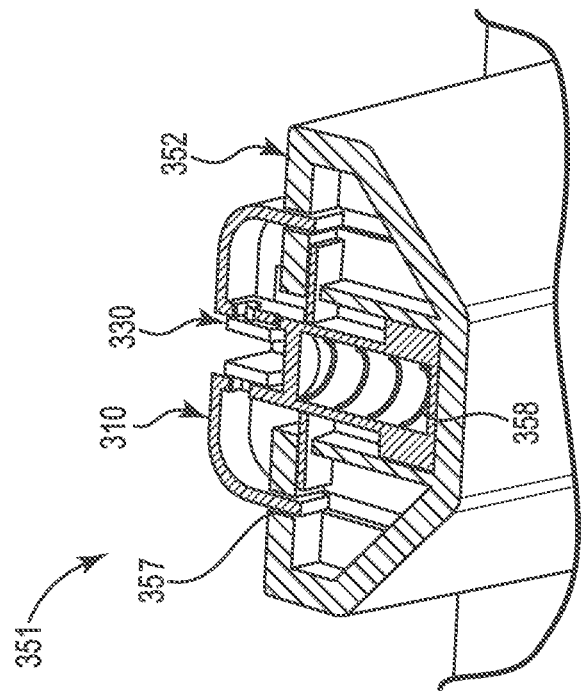
FIG. 3D is a section view of an example of the system including the cable guide when in an engaged position and the cover consistent with the disclosure.

FIG. 3A is an exploded view of an example of a system 351 including a cable guide 300 and a cover 355 consistent with the disclosure. FIG. 3B is a view of an example of the system 351 including the cable guide 300 and the cover 355 consistent with the disclosure. FIG. 3C is a section view (taken along section line 333 of FIG. 3B) of an example of the system 351 including the cable guide 300 and the cover 355 consistent with the disclosure. FIG. 3D is a section view (taken along section line 361 in FIG. 3C) of an example of the system 351 when in the engaged position consistent with the disclosure. FIG. 3E is a section view (taken along section line 361 of FIG. 3C) of an example of the system 351 when in a disengaged position consistent with the disclosure.

The cable guide 300 can move between the engaged position, as illustrated in FIG. 3D, and the disengaged position, as illustrated in FIG. 3E. For instance, the cable guide 300 can move from the engaged position to the disengaged position responsive to a force (represented by arrow 367) being applied to the pull tab 330.

As used herein, the term "disengaged position" refers to an orientation of the cable guide 300 in which the cable guide 300 is substantially disposed outside of a housing 352 and no pathway is formed with the housing 352. For instance, when in the disengaged position, an arm (e.g., a first arm 332-1 and/or a second arm 332-2) of a cable flange 310 is disengaged from the housing 352, as illustrated in FIG. 3E. Thus, when in the disengaged position there is an absence of contact (no contact) between the arm and the housing 352, as detailed herein. For instance, in the disengaged position, the arm can be removed from a slot 357 in the housing 352.

The cable flange 330 can be extended substantially out of an opening in the housing 352 when the cable guide 300 is in the disengaged position, as illustrated in FIG. 3E. The opening can be defined by a recessed surface 354. For instance, the cable flange 310 can be dispositioned to the engaged position due to a force imparted by a dispositioning mechanism 358.

When the cable guide 300 is in the disengaged position, a retention mechanism such as the first retention mechanism 318-1 and the second retention mechanism 318-2 can retain the cable flange 310 in the opening of the housing 352. For instance, the first retention mechanism 318-1 can contact a portion 356-1 of a recessed surface 354 and the second retention mechanism 318-2 can contact another portion 356-2 of the recessed surface 354 when in the disengaged position, as illustrated in FIG. 3E.

As illustrated in FIG. 3C, the cover 355 and the cable flange 310 can together define some or all of an area in which the dispositioning mechanism 358 can be disposed. For instance, the cavity 322 in the cable flange 310 and an inner surface of the cover 355 can together define a portion of the area in which the dispositioning mechanism 358 is disposed. Thus, together the cover 355 and the cable flange 310 can bound an area in which the dispositioning mechanism 358 is to be disposed.

The dispositioning mechanism 358 can disposition an arm (e.g., the first arm 332-1 and/or the second arm 332-2) of the cable guide 300 toward the housing 352. For example, the dispositioning mechanism 358 can be a spring that that can be compressed to disposition the arm of the cable guide 300 toward the housing 352. In this way, the cable guide 300 can be dispositioned toward an engaged position. For instance, the dispositioning mechanism can be a spring that is extended when the cable guide 300 is in the disengaged position, as illustrated in FIG. 3D and that is compressed (undergoing a greater compressive force) when the cable guide 300 is in the disengaged position, as illustrated in FIG. 3E.

Figure 4B:
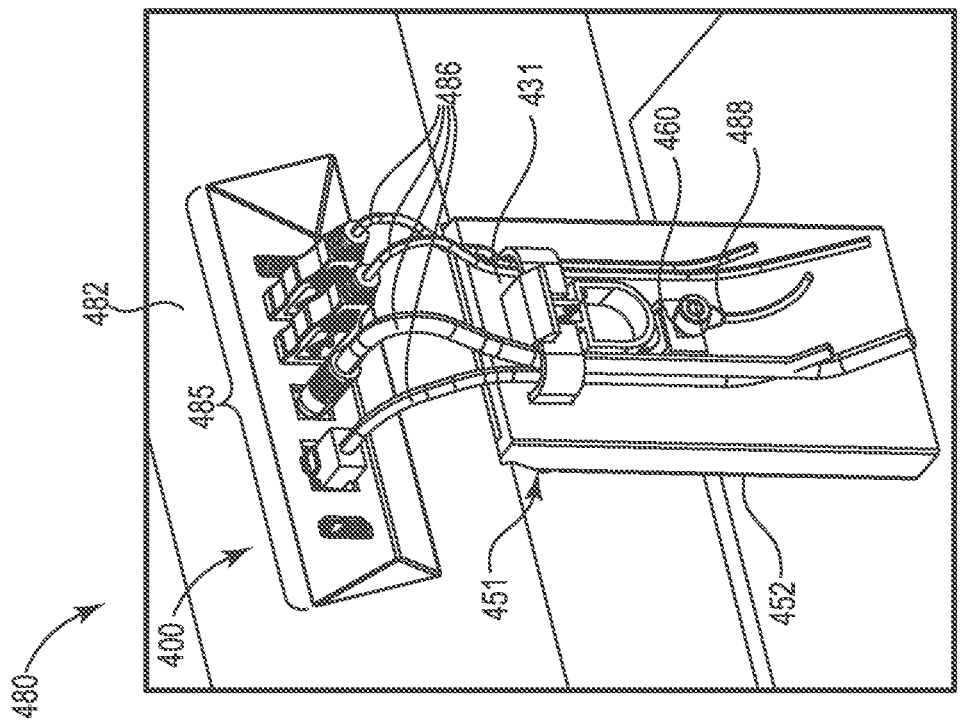
FIG. 4B is a perspective view of an electric device having a housing and a cable guide in an engaged position consistent with the disclosure.
Figure 4A:
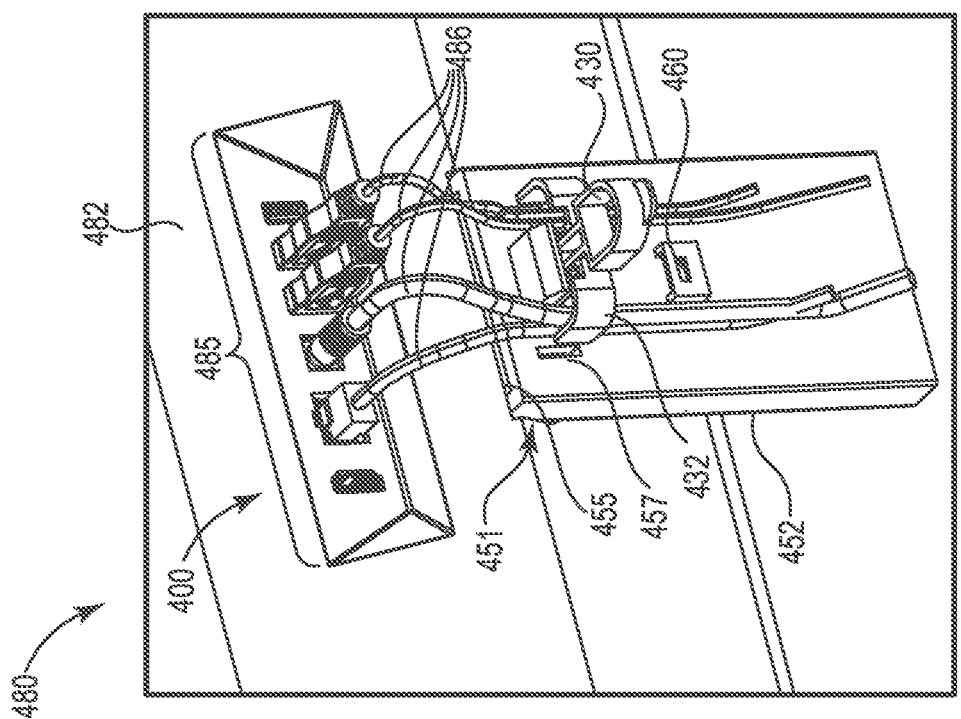
FIG. 4A is a perspective view of an electric device having a housing and a cable guide in an disengaged position consistent with the disclosure.

FIG. 4A is a perspective view of an electric device 480 having a housing 452 and a cable guide 400 in an disengaged position consistent with the disclosure. FIG. 4B is a perspective view of the electric device 480 having the housing 452 and the cable guide 400 in an engaged position consistent with the disclosure.

As used herein, the term "engaged position" refers to an orientation of the cable guide in which the cable guide is substantially disposed outside of the housing 452 and a pathway is formed with the housing 452. When the cable guide 400 is in the engaged position there is contact between a cable flange 410 and the housing 452. For instance, an arm 432 can contact (interfere with) a slot such as slot 457 and thereby retains the cable guide 400 in the engaged position. Thus, the cable guide 400 can interface with the housing 452 to together provide a cable routing mechanism to route cables in and/or around a housing via a pathway. For instance, as illustrated in FIG. 4B, the cable guide 400 can form a pathway 431. For example, the cable flange 410 and an outer surface of the housing 452 can form a pathway 431 to route a cable. As used herein, the term "pathway" refers to an opening formed by objects through which another object can be passed. For instance, a cable of a USB Type-C connector (e.g., or other cables/connectors) can be passed through the pathway 431.

As illustrated in FIG. 4A, the pull tab 430 is in the release position. As used herein, the term "release position" refers to an orientation of the pull tab which promotes an arm of the cable guide to disengage (e.g., not contact) the housing 452. When the pull tab 430 is in the release position (e.g., as illustrated in FIG. 4A), lateral (or substantially lateral) movement of the cable guide 400 is permitted.

As illustrated in FIG. 4B, the pull tab 430 is in the secure position. As used herein, the term "secure position" refers to an orientation of the pull tab in which the pull tab is to contact the housing 452. For example, when the pull tab 430 is in a secure position, a locking mechanism 488 can contact a security tab (e.g., security tab 133 as described in FIG. 1a) of the pull tab 430 and thereby prevent any lateral (or substantially lateral) movement of the cable guide 400.

In some examples, a lock slot 360 can be provided. As used herein, the term "lock slot" refers to an opening in a material the housing 452 that is to receive a locking mechanism. The lock slot 360 can be included in the housing 452 at a location that is proximate to a security tab of the pull tab 430 when the pull tab 430 is in a secure position.

To prevent an unauthorized removal of a cable and/or a peripheral device, the lock slot 460 can receive a locking mechanism such as the locking mechanism 488 as illustrated in FIG. 4B. As used herein, the term "locking mechanism" refers to a device to secure an object in a particular position. For example, the locking mechanism can retain a pull tab 430 in a secure position by blocking rotation/removal of the pull tab 430 from the secure position and in turn prevent the size of the pathway 431 from being modified. Thus, in some examples, the locking mechanism 488 can be disposed in and removably coupled to the lock slot 460. Examples of the locking mechanism 488 include a Kensington lock (and the lock slot 460 can be a Kensington Security Slot). However, the locking mechanism 488 can be any other type of locking mechanism.

The electronic device 480 can be a monitor 482 having a housing 452 which forms a stand for the monitor 482. As illustrated in FIG. 4B, the cables 486 can be routed through the pathway 431 and connectors 485 corresponding to the cables 486 can be connected to I/O ports of the housing 452. As illustrated in FIG. 4B, the connectors 485 and corresponding cables 486 have been routed through the pathway and the cable guide 400 is secured in the engaged position. However, if a user wished to remove or reroute the cables 486 and associated connectors, a user may simply move the pull tab 430 from the secure position to the release position and adjust a size of the pathway by moving (e.g., translating) the cable guide 400 relative to the housing 452.

Cable guides according to the disclosure can allow for secure routing of cables in and/or around a housing. Such cable routing can provide for an organized and re-usable cable routing system that can prevent tangled cables and/or reduce clutter in and/or around the housing. Additionally, such a routing mechanism can allow for easier movement and/or removal of cables as compared with previous approaches. Further, the routing mechanism can provide increased security to prevent unauthorized removal of such cables from the housing as compared with previous approaches.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 102 may refer to element 100 in FIG. 1A and an analogous element may be identified by reference numeral 300 in FIG. 3A. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A cable guide comprising:
   a cable flange including:
      a body;
      an arm extending a distance away from the body;
      a retention mechanism to retain the cable flange in a housing; and
      a first attachment mechanism; and
   a pull tab including a second attachment mechanism coupled to the first attachment mechanism; wherein:
      the pull tab further comprises a pull ring having an annulus with an opening;
      the arm is disengaged from the housing when the cable guide is in a disengaged position; and
      the arm is engaged with the housing and the cable flange and the housing are to form a pathway when the cable guide is in an engaged position.

2. The cable guide of claim 1, further comprising a torsion mechanism to disposition the pull tab to a secured position, and wherein the pull tab is engaged with the housing in the secured position.

3. The cable guide of claim 2, wherein the torsion mechanism is torsion spring disposed at an interface between the first attachment mechanism and the second attachment mechanism.

4. The cable guide of claim 1, wherein the body includes a cavity to receive a dispositioning mechanism which, when present, is to disposition the cable guide to the engaged position.

5. The cable guide of claim 1, wherein the body is an elongated body have a first distal end and a second distal end, wherein the arm is located at the first distal end, and the retention mechanism is located at the second distal end.

6. The cable guide of claim 1, wherein the arm is formed of an open curve.

7. The cable guide of claim 1, wherein the arm is included in a plurality of arms, wherein each arm of the plurality of arms has the same shape and size.

8. An apparatus, comprising:
   a cable flange including:
      a body;
      a first arm that extends a first distance from the body;
      a second arm that extends a second distance from the body;
      a retention mechanism to retain the cable flange in a housing; and
      a first attachment mechanism; and
   a pull ring including an annulus and a second attachment mechanism extending from the annulus, wherein the second attachment mechanism is coupled to the first attachment mechanism to rotatably couple the cable flange to the pull tab; wherein:
      the first arm and the second arm are disengaged from the housing when the cable guide is in a disengaged position; and
      the first arm and the second arm are engaged with the housing and the cable flange and the housing are to form a first pathway and a second pathway, respectively, when the cable guide is in an engaged position.

9. The apparatus of claim 8, wherein the first distance and the second distance are equal.

10. The apparatus of claim 8, wherein the first arm extends from a first side of the body and wherein the second arm extends from a second side of the body that is opposite from the first side of the body.

11. The apparatus of claim 8, wherein the cable flange is a unitary body including the body, the first arm, the second arm, the retention mechanism, and the first attachment mechanism.

12. A system comprising:
a housing having a recess; and
a cable guide comprising:
  a cable flange including:
    an elongated body having a first distal end, a second distal end, and a cavity between the first distal end and the second distal end;
    a first arm at the first distal end;
    a second arm at the first distal end;
    a retention mechanism at the second distal end to retain the cable flange in the recess of the housing; and
    a first attachment mechanism;
  a pull ring including an annulus and a second attachment mechanism coupled to the first attachment mechanism to rotatably couple the cable flange to the pull tab;
  a torsion mechanism disposed at an interface between the first attachment mechanism and the second attachment mechanism to disposition the pull ring to a secure position; and
  a dispositioning mechanism in the cavity to disposition the cable flange to an engaged position; wherein:
    the first arm and the second arm are disengaged from the housing when the cable guide is in a disengaged position; and
    the first arm and the second arm are engaged with the housing and the cable flange and the housing are to form a first pathway and a second pathway, respectively, when the cable guide is in the engaged position.

13. The system of claim 12, wherein the first attachment mechanism comprises a notch or a corresponding protrusion, and wherein the second attachment mechanism comprises the other of the notch or the corresponding protrusion.

14. The system of claim 12, wherein the pull ring further comprises a security tab extending from annulus.

15. The system of claim 12, wherein the pull ring is a unitary body including the annulus, a security tab, and the second attachment mechanism.

16. The system of claim 12, wherein the housing further includes a lock slot.

17. The system of claim 16, wherein the lock slot is located in the housing at a location that is proximate to a location of a security tab of the pull tab when the pull tab is in a secure position.

18. The system of claim 17, wherein the locking mechanism is removably coupled to the lock slot.

19. The system of claim 12, the opening in the annulus further comprises a U-shaped opening.

* * * * *